March 21, 1939.   R. C. BELGAU   2,150,905
INTERNAL COMBUSTION MANIFOLD SYSTEM
Filed June 25, 1935   4 Sheets-Sheet 1
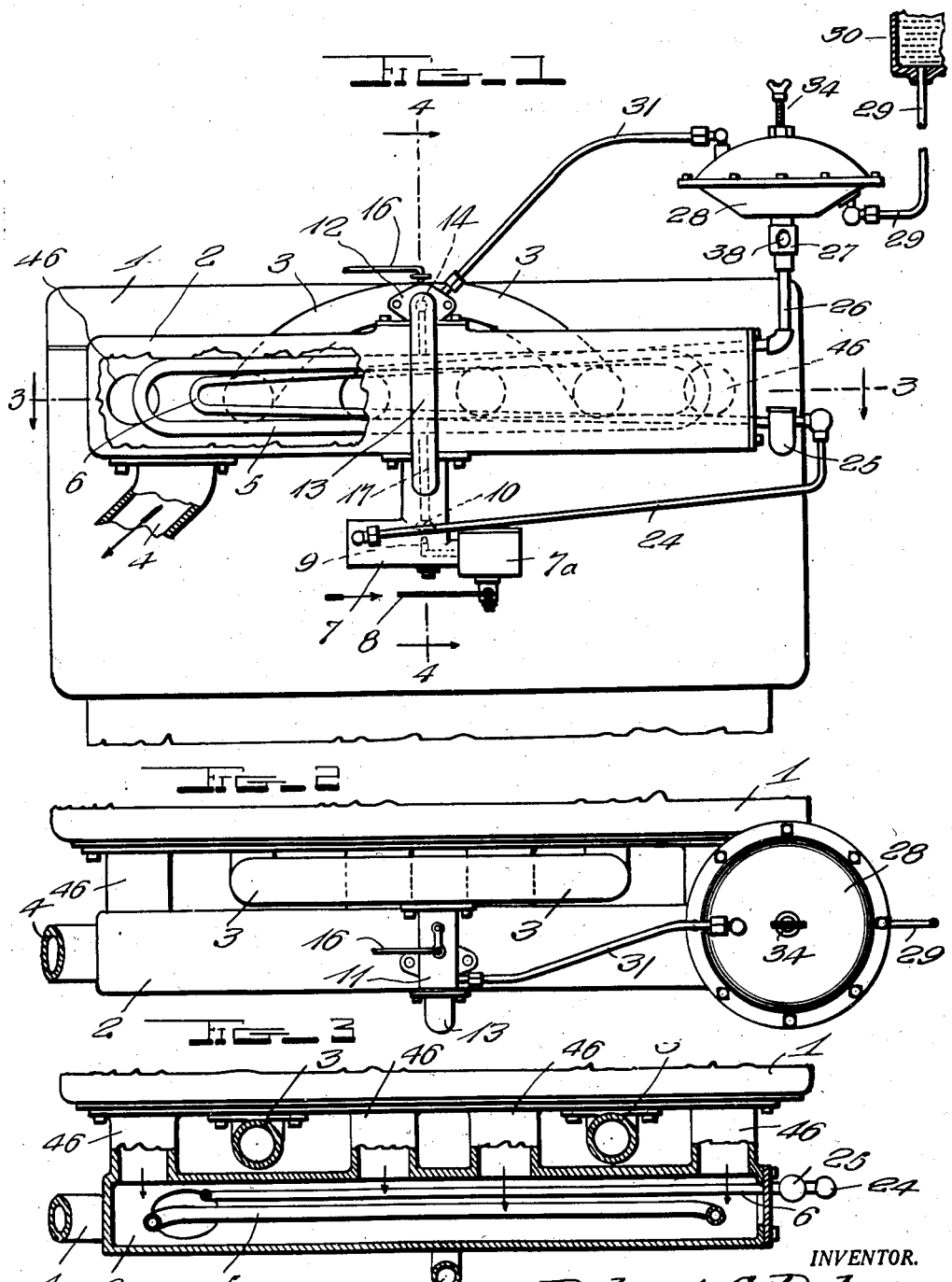
INVENTOR.
Robert C. Belgau,
BY
Jacobi & Jacobi   ATTORNEYS.

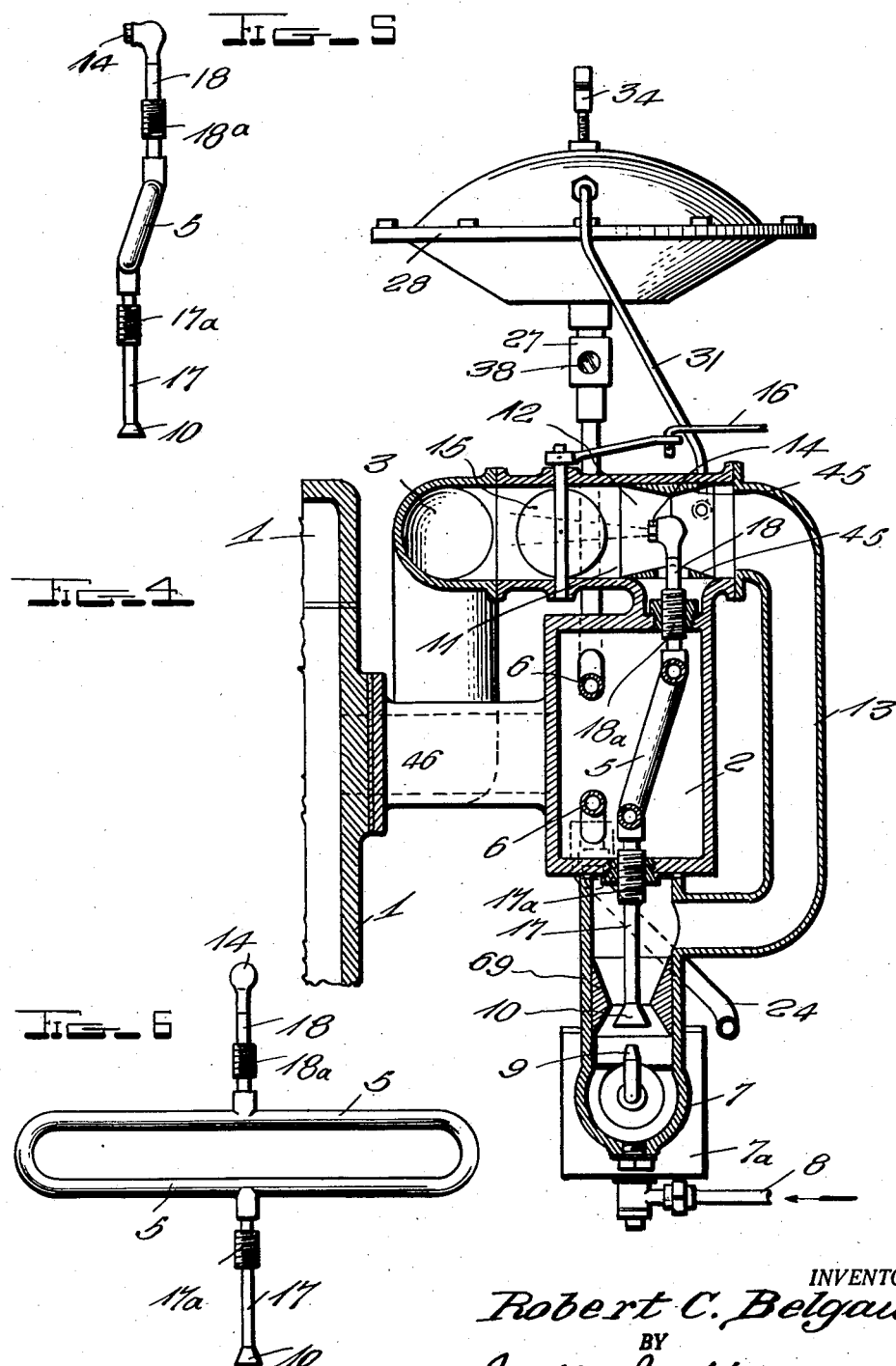

March 21, 1939.　　　R. C. BELGAU　　　2,150,905
INTERNAL COMBUSTION MANIFOLD SYSTEM
Filed June 25, 1935　　　4 Sheets-Sheet 3
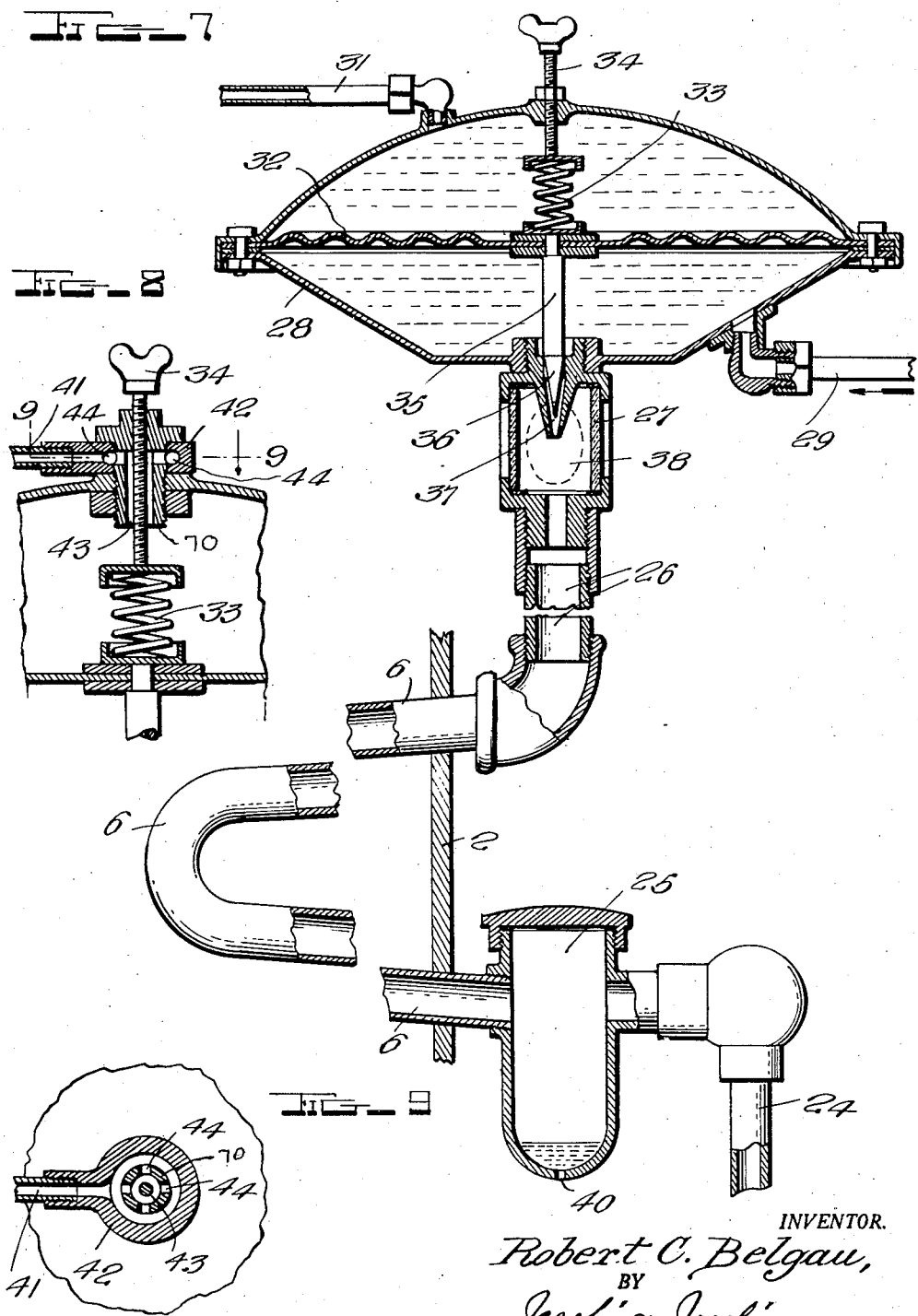
INVENTOR.
Robert C. Belgau,
BY
Jacobi & Jacobi ATTORNEYS.

March 21, 1939.　　　R. C. BELGAU　　　2,150,905
INTERNAL COMBUSTION MANIFOLD SYSTEM
Filed June 25, 1935　　　4 Sheets-Sheet 4
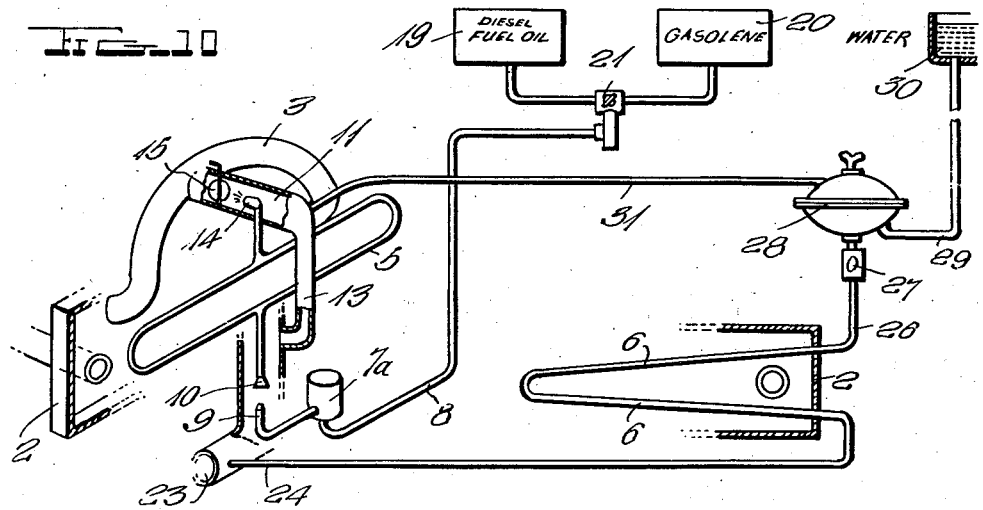
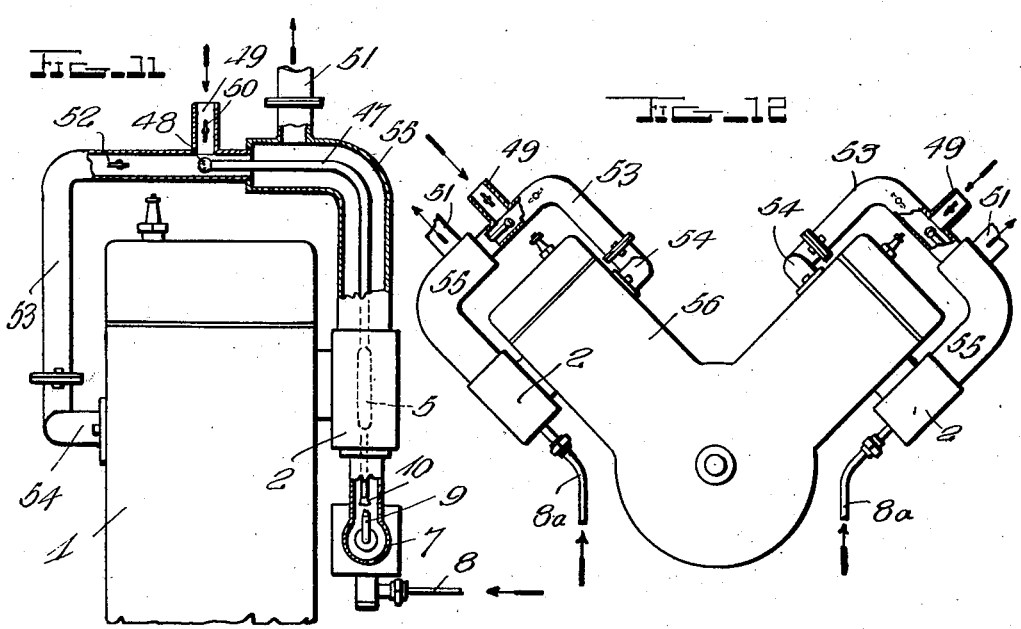
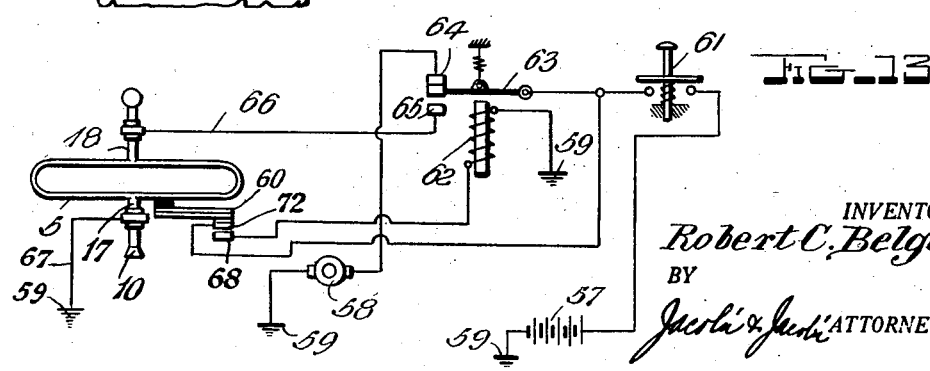
INVENTOR.
Robert C. Belgau,
BY
Jacobi & Jacobi ATTORNEYS.

Patented Mar. 21, 1939

2,150,905

UNITED STATES PATENT OFFICE 2,150,905

INTERNAL COMBUSTION MANIFOLD SYSTEM

Robert C. Belgau, Miami, Fla.

Application June 25, 1935, Serial No. 28,313

8 Claims. (Cl. 123—133)

My invention relates to an internal combustion engine primarily for burning heavy fuels of high vaporizing point, and in particular to an engine wherein the atomized fuel is pre-heated before being mixed with the air.

An object of my invention is to provide an engine wherein the vaporized fuel is pre-heated in a dual-passage heater tube of small cross-section positioned in the exhaust manifold.

Another object of my invention is to provide an engine wherein cold air is mixed with the pre-heated vaporized fuel a small fractional part of a second before the mixture is ignited in the cylinder.

Another object of my invention is to provide a steam super-heating tube in the exhaust manifold to generate steam to be added to the vaporized fuel, and to provide means for controlling the admission of water into the steam tube in accordance with the actual load.

Another object of my invention is to provide an engine wherein the pre-ignition of the mixture (of the pre-heated fuel and cold air) in the intake manifold, is prevented by the addition of the required amount of unheated air to the gasified fuel, immediately at the entrance portal of the mixing chamber of the intake manifold.

A further object of my invention is to provide a gas generator and a steam generator using heat generated by the exhaust gases and whose products provide the gaseous fuel for the internal combustion engine.

A still further object of my invention is to provide a cold-air by-pass from the air intake around the carburetor and direct to a mixing chamber positioned at the entrance to the intake manifold.

Still another object of the invention resides in providing a device which is simple and durable in construction, inexpensive to manufacture and one which will be very efficient in operation.

With these and numerous other objects in view, my invention consists in the novel features of construction, combination and arrangement of parts as will be hereinafter referred to and more particularly pointed out in the specification and claims.

In the accompanying drawings forming a part of this application:

Figure 1 is a side elevation with parts broken away of my hydrocarbon engine, embodying the construction of manifold of my invention;

Figure 2 is a top view of Figure 1;

Figure 3 is a horizontal sectional view taken substantially on line 3—3 of Figure 1, showing more particularly the exhaust manifold, intake manifold and adjacent parts;

Figure 4 is a transverse sectional view on an enlarged scale taken on line 4—4 of Figure 1 and looking in the direction of the arrows;

Figure 5 is an end elevation of the trombone heater tube, showing an offset embodiment thereof;

Figure 6 is a front elevation of the trombone heater tube of Figure 5;

Figure 7 is a sectional view on an enlarged scale through the diaphragm device, controlling the amount of moisture fed to the engine according to its load, and showing a corrugated type of diaphragm structure;

Figure 8 is a modified form of diaphragm control device, and illustrates a sectional view through a portion of the diaphragm device showing a different form of entrance portal for connecting with the intake manifold;

Figure 9 is a horizontal sectional view taken on the line 9—9 of Figure 8 and showing more particularly the plurality of orifices in the entrance portal of the diaphragm chamber;

Figure 10 is a general schematic view of the assembly of the apparatus showing diagrammatically the paths of flow of the fuel, steam, and air;

Figure 11 shows the manner of applying my manifold system to the type of engine having the intake on one side of the cylinder block and the exhaust on the other side;

Figure 12 shows the manner of applying my manifold system to the V type of motor such as the Ford V-8; and Figure 13 shows the manner of applying my vaporizing tube system in connection with an electric system for initial heating of the vaporizing tube.

In describing the invention, I shall refer to the drawings in which similar reference characters designate corresponding parts throughout the several views.

Referring more particularly to Figures 1 and 10, the numeral 1 is the cylinder block of the motor, 2 the exhaust manifold, and 3 the intake manifold, of an internal combustion engine, such as a four-cylinder engine. The numeral 4 designates the discharge orifice for exhaust gases from the exhaust manifold. The numeral 5 designates the vaporizing heating tube which is shown in the form of a dual-path trombone-shaped tube and which is positioned in the exhaust manifold. This tube is continuous and as shown is arranged substantially to form the sides of a rectangle with rounded ends and of length great relative to its width. The numeral 6 designates a steam generating tube which is also mounted in the exhaust manifold and which converts water into steam to be added to the vaporized fuel in accordance with the load carried by the engine. The numeral 7 designates the carburetor comprising the float chamber 7a to which is connected the fuel intake 8. The numeral 9 designates the atomizing fuel jet of the carburetor. The trombone-shaped vaporizing tube 5 is provided centrally of its length with an intake pipe 17 and a delivery pipe 18 attached to its opposite long sides. The pipes 17 and 18 are provided with terminal portions, the pipe 17 having the threaded sleeve 17a and the pipe 18 having the threaded sleeve 18a, respectively adapted to engage apertures in the exhaust manifold. Pipe 17 is provided at its end with a flared terminal portion 10 for receiving the atomized fuel from the spray nozzle 9 of the carburetor. The pipe 18 extends into the mixing chamber 11 which may be in the form of a pipe of substantial diameter, and the delivery nozzle 14 is attached to the end of pipe 18 for delivering a jet of vaporized fuel into the mixing chamber. The jet terminal 14 is positioned in a throat or restricted portion 12 of mixing chamber 11, having the inset portions 45 forming a Venturi tube. The numeral 15 designates a throttle valve which is shown as a butterfly valve, having an actuating handle 16.

Referring particularly to Figure 10, the tank containing the fuel, ordinarily Diesel fuel oil, is shown at 19, and a small tank 20 contains a supply of gasoline for starting before the engine gets heated up. A two-way cock 21 changes the connection from the gasoline to the Diesel fuel after the engine gets warmed up, and is connected by the fuel line 8 to the float chamber 7a.

Instead of the usual type of float chamber, there may be employed advantageous a metering pump, which is indicated for application particularly in Figure 12 hereof.

The carburetor or metering pump is secured to the under side of the exhaust manifold 2 by means of a flange on the top of the carburetor and against a surface provided therefor on the exhaust manifold, and in a position such that when trombone vaporizing tube 5 is located within the exhaust manifold as shown, the flared end 10 of tube 17 will be a little over the top of the fuel jet 9 in the Venturi throat 69 of the discharge orifice of the carburetor or metering pump, and as shown the Venturi throat has one portion in register with the flared portion 10 of pipe 17.

Trombone-shaped tube 5 may be tipped or offset by a small angle such as 5° from the vertical as shown, which type of structure is particularly useful on engines in which the exhaust manifold is located very close to the cylinder block to provide space so that the throttle valve may be located between the gas jet and the cylinder. The pipes 17 and 18 may be of larger diameter than the trombone tube 5 itself, to facilitate the entrance and delivery of fuel. The offsetting of the trombone tube by a small angle provides space for the throttle valve to be located between the gas jet and the cylinder.

It will be obvious that my trombone-shaped heater tube operates to super-heat the atomized fuel after it leaves the fuel jet 9 of the metering device. I have found that the trombone shape of heater tube has important advantages, and provides a large heating surface, and also a dual passage from the fuel jet 9 where the fuel enters the heater tube, to the gas delivery jet 14. One advantage of the trombone shape of tube is that should one passage become stopped with carbon, as because of improper mixture, the heat applied to the trombone tube would burn out the carbon, while meantime the motor would continue to operate, receiving fuel through the remaining open passage. The employment of the two-path trombone tube also permits the employment of a vaporizing tube of diameter smaller than would be necessary for a one-path tube, and gives greater contacting and heating surface for a given delivered volume of gaseous fuel, and thereby assures complete gasification. The trombone shape of tube also acts to prevent the flooding of the vaporizing tube when the choke is used to stall the engine, since the fuel that condenses in the heater tube will immediately drain out.

The steam generator tube 6 is preferably made in a V-shape as shown in order to provide a natural drainage so that in case the valve of the diaphragm device 28 should leak, the tube 6 would not become filled with water and cause the engine to stop from excessive moisture when it has just been started. If some other shape of tube were employed instead of the tube 6, such as a helical coil, it would have to be mounted in an upright position to permit a natural drainage and would not provide ample heating surface in the relatively small exhaust manifold.

I have found that it is desirable to make both the vaporizing tube 5 and the steam generator tube 6 of very thin stainless steel, so that they will heat quickly and will readily change in temperature as the engine load and speed changes.

Any tendency which may exist to pre-ignition in the manifold or in the cylinders is prevented by properly designing the various parts, and keeping the mixture cooled below the pre-ignition condition. To accomplish this, the diameter and length of the heater or vaporizing tube must be selected of the proper size so that the fuel is not under-heated, and also so that the proper amount of air enters the heater tube with the atomized fuel, so that rapid heat transmission and uniform heating takes place. Small tubing permits of fast gas travel, whereas tubing of large diameter reduces the speed of gas travel. If the tube diameter is made too small and its length is too short, the vaporized fuel will not become sufficiently heated. On the other hand, should the tube diameter and length be too great, the expansion of the fuel plus the slow travel will cause partially vaporized fuel to have a tendency to be forced down and out around the jet in the carburetor or metering pump, and an oversized vaporizing tube also permits the admission of too much air and causes partial pre-ignition in the heater tube known as back firing in the carburetor.

My manifold system operates as a miniature gas generating plant in which the exhaust heat is used to transform the fuel to the gaseous state, and the engine then operates on manufactured gas after the manufacture of the gas has once started.

The entrance of water into steam generating tube 6 is controlled by a diaphragm device 28 and a needle valve 36—37, as shown most particularly in Figure 7. The diaphragm device 28 comprises an upper chamber or suction chamber and a lower chamber to which water is admitted from a water tank 30 through a pipe 29, or from the water manifold of the motor. The lower chamber delivers water fed by gravity from the tank 30 directly to the needle valve 36—37. The actuating member 35 of the needle valve is mounted centrally on the diaphragm 32, which is held in a normal rest position by the spring 33 which may be adjusted by the screw member 34. The upper suction chamber of the diaphragm device is connected by the pipe 31 to the intake manifold or to the mixing chamber 11; as the member 35 rises and falls, the movable member 36 of the needle valve comes into closer or more open engagement with the fixed portion 37 of the needle valve, and as the movable portion rises, water is allowed to drop into the lower chamber of the needle valve which has the sighting glass 38. As the load is placed on the engine, it is necessary to open the throttle in order to avoid stalling the engine, and a suction is created in the intake manifold or in the mixing chamber, which is applied through pipe 31 to diaphragm 32 and operates to pull up on the diaphragm 32, and this causes water to drop through the needle valve, pipe 26, steam generator tube 6, and pipe 24 into the air intake of the carburetor 7, and the water is thereby carried with the output of the carburetor, in the form of steam, and delivered to the mixing chamber. The lift of diaphragm 32 varies with the force of the suction, and hence the amount of water admitted through valve 37 varies with the engine load and speed. The addition of the steam to the gaseous fuel controls the combustion and flame travel and detonation and improves the performance of the engine.

The numeral 25 designates a water trap having an aperture 40 in the bottom thereof to permit the escape of any water which may accumulate. Such a condition may exist, for instance, in starting a cold motor, when it is necessary to use a choke located in the air intake of the carburetor or metering pump, and the employment of such a choke would cause the diaphragm device to open the needle valve, so that water would enter the manifold system to an excess, were it not for the escape provision of the trap 25 through its aperture 40. The aperture 40 should be sufficiently large to permit the escape of the water from the trap, but should be sufficiently small so that it does not impair the proper operation of the steam generator tube 6. The addition of the steam to the gaseous fuel also entirely eliminates carbon accumulation in the engine because it adds the extra humidity needed for economy and efficiency in engine performance.

The air by-pass tube 13 is connected directly from the outlet orifice of the carburetor or metering pump, on the discharge side of the restricted throat or Venturi portion 69, and beyond the flared terminal portion 10 which receives atomized fuel for vaporizing tube 5. The by-pass tube 13 is connected to the mixing chamber 11, and operates to by-pass the major portion of the air which enters the carburetor or metering pump through the air intake, as soon as it leaves the throat portion 69 under cracking-contribution force of a vacuum effect, without this major portion of the air being heated by passing through vaporizing tube 5. As shown, particularly in Figure 4, by-pass tube 13 is mounted outside of and spaced from exhaust manifold 2, so that it is not directly heated by the exhaust gases.

The throttle valve is located just as close to the intake port of the engine as is physically possible, so that from the time the heated fuel leaves the generator until it is burned in the cylinder, only a small fraction of a second of time has elapsed. In this manner, even though the heated fuel is cooled by the intake air in the mixing chamber and enters the cylinder at about the normal fuel temperature, sufficient time has not been allowed for condensation of the fuel before it is exploded or ignited. Combustion or ignition within the heater tube is not possible since there is not sufficient air to support combustion.

In the types of manifold heretofore employed for heavy fuels, the mistake has been made of pre-heating the total mixture, including all the air before it reaches the cylinder. This arrangement is unsatisfactory, first, because if the mixture is pre-heated to 350 or 450 degrees Fahrenheit, which is approximately the minimum required to gasify the fuel, the free oxygen in the air is partially consumed and this causes loss of power, and the volume of mixture which is so heated is too great for the heating capacity of the exhaust gases available. Hence, a large portion of the mixture enters the cylinder in a humid or incompletely vaporized state, which contributes largely to crank case dilution. Furthermore, the raising of the "flash" heat to about 750 to 950 degrees is very desirable, but practically attainable only by separating the fuel from the air as has been explained. Furthermore, the admission of hot air under the intake valves of an engine has a tendency to cause constant valve warping and sticking, which is avoided by the employment of my by-pass.

By employing the by-pass which I disclose, the fuel is heated to the proper temperature of about 950 degrees Fahrenheit and the cold air from the by-pass is mixed with the hot gas a small fraction of a second, about one fiftieth to one one-hundred-twentieth second, before the mixture is ignited in the cylinder. The cold air cools the gas to about 180 degrees, and the proximity of the gas jet to the cylinder prevents condensation because of the short period of time. The temperature of 180 degrees is about normal motor temperature and is not harmful to the valves. This method of heating the atomized fuel after it leaves the metering device and of by-passing the major portion of the air is, therefore, an important feature of my invention.

In constructing and assembling my manifolds, the end of the exhaust manifold to which is attached the steam tube 6, is secured by cap screws to the manifold. By removing these cap screws, the steam tube can be readily removed from the manifold. Then by removing the carburetor or metering pump and the by-pass tube 13 and the mixing chamber 11, the terminal tubes 17 and 18 of the vaporizing tube 5 can be removed, after the nuts engaging their threaded portions have been removed. The vaporizing tube 5 can then be removed through the open end of the exhaust manifold without difficulty, should it become necessary to replace vaporizing tube 5. Preferably, I employ for the vaporizing tube 5 a thin tube of stainless steel which has been found to withstand a heat of 2000 degrees for a period of years. Because of its extreme thinness, this tube is quickly adjustable to the sudden temperature changes occurring with changes in engine speed and load.

In cases where a low grade of fuel is to be used and which is of such gravity and characteristics that it will not readily flow through the jet by engine suction, a fuel pump of special design, such as that described in my copending application, above mentioned, is employed instead of the carburetor, and thereby the fuel is forced under pressure through the jet so that proper atomization occurs before the fuel is taken into the heater tube.

Figure 11 shows the type of manifold and manner of applying my invention to an engine of the type having the intake on one side of the cylinder block and the exhaust on the other side. It is necessary to modify the design to attain the same results which have been above described, that is, the fuel to be burned has to pass through a gas generator tube to become a dry gas, while the intake air in its major portion must be kept in an unheated condition before entering the mixing chamber. Also, the throttle valve must be located beyond the point to which the air and heated fuel gas are kept separated. There is, however, no essential difference in the functioning of the modification shown in Figure 11. In the arrangement of Figure 11, the air mixture is not drawn through the carburetor but instead an inlet is provided near the gas jet as shown.

Referring to Figure 11, the intake port 54 is located on the opposite side of the cylinder block 1 from the exhaust manifold 5. The intake manifold shown at 53 may be integral with the intake port 54. The numeral 52 designates the throttle valve, and 49 is the air intake of the mixing chamber and is provided with the choke valve 50. The exhaust heater tube 55 extends from the exhaust manifold 2 as shown, and the exhaust gases are discharged through the outlet 51. The discharge pipe of the vaporizing tube 5 is provided with the extension 47 which extends through heater tube 55 and terminates in the jet 48. The numeral 52 designates the throttle valve.

Figure 12 shows the manner of applying my invention to V motors such as the Ford V-8 in which the intake ports are located between the two cylinder blocks and the exhaust ports are located on the outside of each block. The arrangement of Figure 12 is shown as in connection with a pressure feed of fuel from a metering pump, instead of a carburetor. The principles of the embodiment of Figure 12 are the same as those of the embodiments above described. The fuel intake from the metering pump is shown at 8a, and the exhaust manifold 2 has the continuation 55 as in Figure 11. The exhaust gases are discharged at 51, and the air intake is at 49. The intake port is at 54, and the intake manifold at 53, as in Figure 11.

The arrangement of Figure 13 may be employed with an engine equipped with a substantial storage battery such as in busses, trucks, and some passenger vehicles, to facilitate starting, and it is thereby possible to avoid the auxiliary gasoline starting tank 20. As has been stated, the heater tube 5 is made of thin stainless steel, which will become highly heated when a substantial electric current is passed through it. The terminal pipes 17 and 18 of trombone heater tube 5 are connected respectively by wire 67 to the common return or frame 59, and by the wire 66 to one side of the battery 57 which has its other side connected to common return 59. The circuit from wire 66 to battery 57 includes the starter switch 61, and the two point relay 62—63, comprising the winding 62 and the armature 63. One point 64 of the relay is connected through starter 58 to the common return, and the other point 65 is connected to wire 66 to the pipe 18 of the vaporizing tube.

The armature 63 is connected to one contact of the starter switch 61 and also to one side of the element 60 which may be a bimetallic thermostat element as shown, or a time-delay relay having a delay of about thirty seconds, or a bimetallic "flasher" having a period of about thirty seconds. The other end of the element 60 is provided with the contact 68, and the actuating winding 62 of the relay is connected between contact 68 and common return 59. When the starter switch 61 is closed, the battery delivers energy to the starter 58. The armature 63 is provided with a spring which normally holds it up in contact with contact 64, but when the element 60 contacts 68 and the circuit through relay winding 62 is closed, armature 63 is pulled down into engagement with contact 65, and the battery supplies energy through vaporizing tube 5. This continues as long as contact 68 is closed. The element 60 may be a thermostat element positioned in heat exchange relation with tube 5 and contact 68 will remain closed until thermostat element 60 is heated to a temperature which will open contact 68, whereupon the relay will release and the circuit will be closed to contact 64 and starter 58. The same type of action will occur if the element 60 is a time relay or a "flasher" of a period of about thirty seconds. The wire 66 may be attached to pipe 18 permanently through porcelain or other insulating sleeve where it passes through the exhaust manifold, and a similar construction may be used for connecting wire 67 if desired, although it will be noted that wire 67 connects to the frame or common return.

After the battery current has thus passed through vaporizer tube 5 for approximately thirty seconds, the tube 5 is sufficiently hot so that when the atomized fuel enters the tube it is instantly vaporized and then converted into dry gas, and when armature 63 is released to contact 64 and the battery current traverses starter 58, the motor is "cranked" and starts.

In operation, the engine provided with my manifold operates for the first instant on gasoline from tank 20, except in the modification which has been described and is shown in Figure 13, wherein the initial heating of vaporizer tube 5 is effected through the battery. In the arrangement shown particularly in Figure 10, the cock 21 is first turned to allow the entrance of gasoline from tank 20 to float chamber 7a, and after a few seconds, when the exhaust manifold and the vaporizer tube 5 have become highly heated, the cock 21 is turned to shut off the gasoline and allow the entrance of fuel oil from tank 19. The liquid fuel traverses pipe 22 to float chamber 7a, and is delivered through jet 9 into the flared terminal 10 of the entrance pipe 17 of vaporizer tube 5 by the concurrently cooperative forces of heat absorbed thereby and the vacuum effect created by the venturi 12—45 advantageously if not essentially to lower the degree of heat needed or length of time of absorption of heat. The atomized fuel is converted into dry gas in vaporizer tube 5, and is delivered through gas jet 14 into the mixing chamber 11. The air enters the carburetor through air intake 23 and as has been explained, the major portion of the intake air does not pass through vaporizing and gasifying tube 5, but is diverted through by-pass tube 13. The steam from steam generator 6 is introduced into the air intake 23. The cold air including a certain amount of super-heated steam is mixed with the dry gasified fuel in the mixing chamber 11, before the mixture reaches the throttle valve 15. This lowers the temperature of the gas in the mixing chamber 11 from about 900 degrees Fahrenheit to about 180 degrees before the mixture enters the cylinder. The presence of the steam in the mixing chamber, together with the relatively low temperature, eliminates the tendency to pre-ignition, and "detonation" caused thereby is eliminated. The admisison of water to the steam generator tube 6 is controlled in direct proportion to the load carried by the engine by means of the suction on the diaphragm device, so that the explosive mixture delivered to the intake manifold is proportioned properly in accordance with the load.

The intake manifold 3 connects all of the intake ports on one side of the engine and is in the form of a curved pipe rising to a point above the top of the exhaust manifold. The mixing chamber 11 is shown as cylindrical, and is connected substantially perpendicularly to the intake manifold 3 at this highest point, and mixing chamber 11 extends across the top of the exhaust manifold close thereto, to receive the fuel gas pipe and jet 14. The fuel gas jet 14 may be a usual type of delivery jet for combustible gas, such as is ordinarily used for natural gas. The numeral 46 designates the tubes connecting the exhaust ports of the engine to the exhaust manifold. The pipe 31 from the top chamber of the diaphragm device is connected to mixing chamber 11 on the side of the fuel gas jet opposite the throttle valve, since at this point the air pressure due to engine suction varies in direct proportion to the load on the engine.

The adjusting screw 34 is adjusted so that when the engine is idling or not under load at slow speed, the needle valve will be resting on the valve seat and no water will pass into steam tube 6.

In Figs. 8 and 9, there is shown a modified form of entrance portal for the upper chamber of diaphragm device 28, to connect with the mixing chamber 11. This entrance portal is symmetrical with reference to the actuating shaft of the needle valve, and comprises collar 42 provided with a central circular recess which communicates with mixing chamber 11 by pipe 41. A hollow cylindrical member 70 is positioned axially with respect to rod 34 and surrounds the latter, is inside the circumference of the circular recess in collar 42, and is provided with a plurality of radial apertures 44 communicating from the outer space open to pipe 41, to the inner annular space 43 which is open into the upper chamber of diaphragm device 28. This form of connection applies rapid variations of the pressure in mixing chamber 11 more symmetrically to the diaphragm.

Therefore I have provided a construction which is a great improvement over the type of distillate manifolds for engines heretofore employed, wherein the total mixture of vaporized fuel and air has been pre-heated together, which is very unsatisfactory, and produces crank-case dilution, valve warping, pre-ignition, and carbon deposits. I provide my trombone-shaped fuel pre-heating and vaporizing tube, which is mounted in the exhaust manifold, and has two separate paths for the fuel while being vaporized. I also provide my mixing chamber at the entrance to the intake manifold, wherein the vaporized fuel which has been pre-heated in the vaporizing tube is mixed with the cold air which has been by-passed around the vaporizing tube.

From the foregoing description of the construction of my improved manifold system apparatus, the application of the same to use will be readily understood. It will be seen that I have provided a simple, inexpensive, and efficient means for carrying out the objects of the invention, and which can be readily manufactured at small cost.

While I have particularly described the elements best adapted to perform the functions set forth, it is obvious that various changes in form, proportion, and in the minor details of construction may be resorted to without departing from the spirit or sacrificing any of the principles of the invention.

Having thus described the invention, what is claimed is:

1. In an internal combustion engine, a fuel mixture intake manifold, an exhaust manifold, a relatively long and narrow trombone-shaped vaporizing tube positioned in said exhaust manifold, said tube being continuous and arranged substantially to form the sides of a rectangle with rounded ends and of length great relative to its width, a single entrance pipe mounted centrally on one of the long sides of said tube, a single delivery pipe mounted centrally on the other of the long sides of said tube and provided with a delivery nozzle at its end remote from said tube, said nozzle being mounted for delivering vaporized fuel from said tube into said intake manifold, said tube being adapted to provide two similar symmetrical independent fuel channels from said entrance pipe to said delivery pipe, and a fuel jet mounted adjacent the end of said entrance pipe remote from said tube and adapted to spray atomized liquid fuel into said entrance pipe.

2. In an internal combustion engine, a fuel mixture intake manifold, an exhaust manifold, a relatively long and narrow trombone-shaped vaporizing tube positioned in said exhaust manifold, said tube being continuous and arranged substantially to form the sides of a rectangle with rounded ends and of length great relative to its width, a single entrance pipe mounted centrally on one of the long sides of said tube and being provided with a flared terminal portion at its end remote from said tube, a single delivery pipe mounted centrally on the other of the long sides of said tube and provided with a delivery nozzle at its end remote from said tube, said nozzle being mounted for delivering vaporized fuel from said tube into said intake manifold, said tube being adapted to provide two similar symmetrical independent fuel channels from said entrance pipe to said delivery pipe, and a fuel jet mounted adjacent said flared terminal portion of said tube and adapted to spray atomized liquid fuel into said flared terminal portion.

3. In an internal combustion engine, an intake manifold, an exhaust manifold, a mixing chamber communicating directly with said intake manifold, a spray carbureter, a vaporizing tube positioned in said exhaust manifold and being provided with entrance terminal means for receiving atomized fuel from said carbureter, said vaporizing tube being provided with a delivery terminal nozzle positioned in said mixing chamber, and an air by-pass conduit connected directly between the outlet of said carbureter and said mixing chamber and passing substantially thermally remote from said exhaust manifold.

4. In an internal combustion engine, an intake manifold, an exhaust manifold, a mixing tube communicating directly with said intake manifold, a spray carbureter, a vaporizing tube positioned in said exhaust manifold and being provided with entrance terminal means for receiving atomized fuel from said carbureter, said vaporizing tube being provided with a delivery terminal nozzle positioned in said mixing tube, said mixing tube being provided with a restricted throat portion at the point where said nozzle discharges, said carbureter having a discharge orifice provided with a restricted throat portion, and an air by-pass conduit connected directly between the discharge orifice of said carbureter on the side of said throat portion thereof remote from said carbureter and the portion of said mixing tube on the side of the throat portion of said mixing tube remote from said intake manifold, said by-pass conduit being substantially thermally remote from said exhaust manifold.

5. In an internal combustion engine, an intake manifold, an exhaust manifold, a mixing tube communicating directly with said intake manifold, a spray carbureter, a vaporizing tube positioned in said exhaust manifold, an entrance pipe communicating with said vaporizing tube and provided with a flared terminal portion on its end remote from said vaporizing tube, said vaporizing tube being provided with a delivery terminal nozzle positioned in said mixing tube, said mixing tube being provided with a restricted throat portion at the point where said nozzle discharges, said carbureter having a discharge orifice provided with a restricted throat portion, said entrance pipe extending into said discharge orifice and said flared terminal portion of said entrance pipe being substantially in register with said throat portion of said discharge orifice, and an air by-pass conduit connected directly between the discharge orifice of said carbureter on the side of said throat portion thereof remote from said carbureter and the portion of said mixing tube on the side of the throat portion of said mixing tube remote from said intake manifold, said by-pass conduit being substantially thermally remote from said exhaust manifold.

6. In an internal combustion engine, an intake manifold, an exhaust manifold, a mixing chamber communicating directly with said intake manifold, a spray carbureter, a relatively long and narrow trombone-shaped vaporizing tube positioned in said exhaust manifold, an entrance pipe mounted centrally on one of the long sides of said tube for receiving atomized fuel from said carbureter, a delivery pipe mounted centrally on the other of the long sides of said tube and provided with a delivery terminal nozzle positioned in said mixing chamber, said tube being adapted to provide two similar independent fuel channels from said entrance pipe to said delivery pipe, and an air by-pass conduit connected directly between the outlet of said carbureter and said mixing chamber and passing substantially thermally remote from said exhaust manifold.

7. In an internal combustion engine, an intake manifold, an exhaust manifold, a relatively long and narrow trombone-shaped vaporizing tube positioned in said exhaust manifold, an entrance pipe mounted centrally on one of the long sides of said tube, a delivery pipe mounted centrally on the other of the long sides of said tube and provided with a delivery nozzle at its end remote from said tube, said nozzle being mounted for delivering vaporized fuel from said tube into said intake manifold, said tube being adapted to provide two similar independent fuel channels from said entrance pipe to said delivery pipe, a fuel jet mounted adjacent the end of said entrance pipe remote from said tube and adapted to spray atomized liquid fuel into said entrance pipe, means for applying electric energy between said entrance pipe and said delivery pipe, for heating said vaporizing tube, and means actuatable by the temperature of said vaporizing tube for controlling said first mentioned means.

8. In an internal combustion engine, an intake manifold, an exhaust manifold, a mixing chamber communicating directly with said intake manifold, a spray carbureter, a vaporizing tube positioned in said exhaust manifold and being provided with entrance terminal means for receiving atomized fuel from said carbureter, said vaporizing tube being provided with a delivery terminal nozzle positioned in said mixing chamber, an air by-pass conduit connected directly between the outlet of said carbureter and said mixing chamber and passing substantially thermally remote from said exhaust manifold, means for applying electric energy between said entrance terminal means and said delivery nozzle for heating said vaporizing tube, and means actuatable by the temperature of said vaporizing tube for controlling the application of electric energy thereto by said last mentioned means.

ROBERT C. BELGAU.